(12) United States Patent
Sakamoto et al.

(10) Patent No.: US 10,351,929 B2
(45) Date of Patent: Jul. 16, 2019

(54) SULFURIC ACID ADDING FACILITY AND OPERATION METHOD THEREFOR

(71) Applicant: SUMITOMO METAL MINING CO., LTD., Tokyo (JP)

(72) Inventors: Takashi Sakamoto, Tokyo (JP); Osamu Nakai, Tokyo (JP); Masayuki Oku, Tokyo (JP); Hideaki Sato, Tokyo (JP); Sho Shirai, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 15/549,831

(22) PCT Filed: Feb. 8, 2016

(86) PCT No.: PCT/JP2016/053688
§ 371 (c)(1),
(2) Date: Aug. 9, 2017

(87) PCT Pub. No.: WO2016/129560
PCT Pub. Date: Aug. 19, 2016

(65) Prior Publication Data
US 2018/0030569 A1 Feb. 1, 2018

(30) Foreign Application Priority Data
Feb. 12, 2015 (JP) .................. 2015-025507

(51) Int. Cl.
*C22B 3/00* (2006.01)
*C22B 3/02* (2006.01)
*C22B 3/08* (2006.01)

(52) U.S. Cl.
CPC .................. *C22B 3/02* (2013.01); *C22B 3/08* (2013.01); *C22B 23/043* (2013.01); *Y02P 10/234* (2015.11)

(58) Field of Classification Search
CPC . C22B 3/02; C22B 3/08; C22B 23/043; Y02P 10/234
(Continued)

(56) References Cited

U.S. PATENT DOCUMENTS 5,489,326 A * 2/1996 Thomas .................... C22B 3/02
423/27
5,536,297 A * 7/1996 Marchbank ............... C22B 3/08
75/736
(Continued)

FOREIGN PATENT DOCUMENTS

| CA | 963233 A | 2/1975 |
| CN | 203999749 U | 12/2014 |

(Continued)

OTHER PUBLICATIONS

Supplementary European Search Report dated Mar. 12, 2018, issued to EP Patent Application No. 16749204.0.
(Continued)

*Primary Examiner* — Steven J Bos
(74) *Attorney, Agent, or Firm* — Locke Lord LLP; James E. Armstrong, IV; Nicholas J. DiCeglie, Jr.

(57) ABSTRACT

Provided are a sulfuric acid adding facility and an operation method therefor which enable an increase in the maximum capacity and the operation rate of a sulfuric acid supply pump provided in the sulfuric acid adding facility. In a sulfuric acid adding facility, sulfuric acid is added to an autoclave used in a leaching step of a high pressure acid leaching method for a nickel oxide ore. The sulfuric acid adding facility is provided with the same number (n+1) (n is an integer, at least 1) of each of the following: a plurality of sulfuric acid adding pipes for adding sulfuric acid into the autoclave; and a plurality of sulfuric acid supply pumps for supplying sulfuric acid to the sulfuric acid adding pipes. Each of the first through n+1th sulfuric acid supply pumps
(Continued)

includes at least three diaphragms and discharge ports of the same number as that of the diaphragms.

3 Claims, 8 Drawing Sheets

(58) Field of Classification Search
    USPC .................. 423/659, 150.1; 422/242, 226
    See application file for complete search history.

(56) References Cited

U.S. PATENT DOCUMENTS

| | | | |
|---|---|---|---|
| 5,785,736 A * | 7/1998 | Thomas | C22B 3/08 75/736 |
| 7,563,421 B2 | 7/2009 | Kobayashi et al. | |
| 2005/0265910 A1 | 12/2005 | Kobayashi et al. | |
| 2014/0248160 A1 | 9/2014 | Giessbach et al. | |
| 2015/0338027 A1 | 11/2015 | Nakai et al. | |

FOREIGN PATENT DOCUMENTS

| | | |
|---|---|---|
| JP | 47-018772 A | 9/1972 |
| JP | 2005-350766 A | 12/2005 |
| JP | 2014-133209 A | 7/2014 |
| JP | 2014-141749 A | 8/2014 |

OTHER PUBLICATIONS

International Search Report dated Apr. 26, 2016, issued for PCT/JP2016/053688.
Office Action dated Jun. 14, 2016, issued for the Japanese patent application No. 2016-021528 and English translation thereof.

* cited by examiner

SULFURIC ACID ADDING FACILITY AND OPERATION METHOD THEREFOR

TECHNICAL FIELD

The present invention relates to a sulfuric acid adding facility used in a nickel oxide ore wet smelting method and a method for operating the same, more particularly, it relates to a sulfuric acid adding facility used in a leaching step in which an ore slurry obtained from slurrying nickel oxide ore is transferred to a high pressure acid leaching facility and nickel and cobalt are leached out therefrom and a method for operating the same.

BACKGROUND ART

In recent years, a high pressure acid leaching method (HPAL method) using sulfuric acid has attracted attention as a wet smelting process for recovering nickel and cobalt from nickel oxide ore containing iron as a main component and nickel at from 1% by mass to 2% by mass. This method does not include dry treatment steps such as drying and sintering steps but includes a consistently wet step unlike general conventional nickel oxide ore smelting methods, and it is thus advantageous in terms of energy and cost.

Specifically, the nickel smelting method using this high pressure acid leaching method includes, for example, a step of preparing an ore slurry by slurrying nickel oxide ore (ore slurry preparation step), a step of obtaining leached slurry by adding sulfuric acid to the ore slurry and subjecting the ore slurry to a leaching treatment at a high temperature of from 220° C. to 280° C. and a high pressure in a pressure leaching reactor (hereinafter, an "autoclave" will be described as a specific example) to leach out the nickel and cobalt in the ore (leaching step), a step of separating the leached slurry into the leach residue and the leachate containing nickel and cobalt by solid-liquid separation (solid-liquid separation step), a step of neutralizing and separating impurity elements such as iron by adjusting the pH of the leachate containing the impurity elements together with nickel and cobalt to from 3 to 4 (neutralization step), and a step of supplying a sulfidizing agent such as hydrogen sulfide gas to the leachate after being neutralized and separated and recovering nickel-cobalt mixed sulfide (sulfidization step).

Such a high pressure acid leaching method is significantly greatly advantageous since nickel and cobalt can be selectively leached while iron of the main impurity is immobilized in the leach residue in the form of hematite ($Fe_2O_3$) by controlling the oxidation-reduction potential and temperature of the leachate in the autoclave in the leaching step.

Here, in the leaching step, sulfuric acid is added to a compartment 1a of an autoclave 1 through two sulfuric acid addition pipes (lines) 11A and 11B, for example, as illustrated in FIG. 1. Nickel and cobalt and further impurities and the like are leached out from the ore while the ore slurry to which sulfuric acid is added sequentially moves from the compartment 1a to a compartment 1g which have a stirrer.

As a pump (sulfuric acid supply pump) for supplying sulfuric acid, a diaphragm pump, which is a type of positive displacement pump, is frequently used. Conventionally, the sulfuric acid supplied from a sulfuric acid supply pump P (PA, PB) is simultaneously supplied to the autoclave 1 via two sulfuric acid addition pipes LA and LB, for example, as illustrated in FIG. 8. This sulfuric acid supply pump P is equipped with, for example, two units of one unit (pump PA) for normal use and the other unit (pump PB) for standby for maintenance and inspection. The sulfuric acid supply pump P is configured to include, for example, three or more diaphragms D ($DA_1$ to $DA_3$, $DB_1$ to $DB_3$), and discharge ports S ($Sa_1$ to $Sa_3$, $Sb_1$ to $Sb_3$) are provided for the respective diaphragms D.

As illustrated in FIG. 8, for example, in a case in which the sulfuric acid supply pump P is equipped with the three diaphragms D provided with the discharge ports S (three discharge ports), sulfuric acid is supplied to the sulfuric acid addition pipe LA through two discharge ports, discharge port $Sa_1$ and discharge port $Sa_2$, and to the sulfuric acid addition pipe LB through one discharge port $Sa_3$. Hence, it is possible to add sulfuric acid through the sulfuric acid addition pipe LA in an amount to be about twice the amount of sulfuric acid added through the sulfuric acid addition pipe LB.

As described above, each of the two sulfuric acid supply pumps PA and PB is commonly connected to the sulfuric acid addition pipe LA and the sulfuric acid addition pipe LB. For example, in the case of using the sulfuric acid supply pump PA, valves $Va_1$ and $Va_2$ on the sulfuric acid supply pump PA side are opened while valves $Va_3$ and $Va_4$ on the sulfuric acid supply pump PB side are closed among the valves V provided to the sulfuric acid addition pipe LA. In addition, valves $Vb_1$ and $Vb_2$ on the sulfuric acid supply pump PA side are opened while valves $Vb_3$ and $Vb_4$ on the sulfuric acid supply pump PB side are closed among the valves V provided to the sulfuric acid addition pipe LB. The flow rate of sulfuric acid to be supplied into the sulfuric acid addition pipe L can be adjusted by adjusting the pump speed of the sulfuric acid supply pump P and the stroke of the piston.

Specifically, the pump speed is common to all of the discharge ports (for example, the discharge ports $Sa_1$, $Sa_2$, and $Sa_3$ in the pump PA) provided to the sulfuric acid supply pump P, and the stroke can be individually adjusted at each of the discharge port $Sa_1$, the discharge port $Sa_2$, and the discharge port $Sa_3$, for example, in the case of the pump PA. Incidentally, there is an appropriate stroke for the pump speed, and when the stroke is not appropriately adjusted not only is the flow rate of sulfuric acid added not stabilized but also there is a concern that the pipe L becomes damaged or the like, as well as the pump P and the pipe L vibrate to cause a burden on the facility.

Meanwhile, in the nickel smelting method by the high pressure acid leaching method, the sulfuric acid supply pump P is used under a severe condition that the pump P is continuously operated at a discharge pressure exceeding the internal pressure of the autoclave 1 since the treatment is performed by using the autoclave 1 under high temperature and high pressure conditions. For this reason, the frequency of maintenance and inspection and the frequency of occurrence of problems increase in the sulfuric acid supply pump P. Hence, a plurality of sulfuric acid supply pumps P ("two" in general) is usually prepared so that operation is not stopped even at the time of such maintenance and inspection or the occurrence of problems. By preparing a plurality of sulfuric acid supply pumps P in this manner, in normal operation one sulfuric acid supply pump (for example, the sulfuric acid supply pump PA) is operated and the other sulfuric acid supply pump (for example, the sulfuric acid supply pump PB) stands by. Incidentally, the standby sulfuric acid supply pump P is also called a "spare machine". Moreover, at the time of maintenance and inspection, it is usual to switch the series of the operating sulfuric acid supply pump PA and the standby sulfuric acid supply pump PB, that is, to put the sulfuric acid supply pump PA in a standby state and the sulfuric acid supply pump PB in a working state and to continue the operation by using the sulfuric acid supply pump PB while performing the maintenance and inspection of the sulfuric acid supply pump PA.

Here, in the case of switching the sulfuric acid supply pump P to the spare machine (for example, the sulfuric acid supply pump PB), it is necessary to start the operation of the sulfuric acid supply pump PB of the spare machine after the sulfuric acid supply pump PA in operation is stopped. Hence, the addition of sulfuric acid to the autoclave 1 is temporarily stopped, and this does not only decrease the working rate but also greatly decreases the leaching rate of nickel, cobalt, and the like, thus it is required to adjust the amount of neutralizer or the like to be added in the steps after the leaching step in the smelting method of nickel oxide ore. Moreover, a series of switching activities including the adjustment of these added amounts takes at least several hours.

As described above, it is necessary to perform the switching activity for the maintenance and inspection while the frequency of maintenance and inspection of the sulfuric acid supply pump P is high since operation is carried out under severe conditions, and it is thus difficult to maintain operation at a high load and a high working rate. Furthermore, it is also required to adjust the amount of the chemicals to be added in the steps after the leaching step in association with the switching for the maintenance and inspection and the like.

For example, Patent Document 1 discloses a method to simplify the smelting process as a whole and to increase the efficiency by simplification of the treatments in the leaching step and the solid-liquid separation step, a decrease in the amount of neutralizer consumed and the amount of sediment in the neutralization step, the efficient and repeated use of water, and the like in the wet smelting method to recover nickel from nickel oxide ore based on high temperature pressure leaching. However, such a prior art has not proposed a sulfuric acid adding facility to be used in the leaching step or the method for operating the same, and a method of adding sulfuric acid at a high working rate has been desired.

Patent Document 1: Japanese Unexamined Patent Application, Publication No. 2005-350766

DISCLOSURE OF THE INVENTION

Problems to be Solved by the Invention

The present invention has been proposed in view of the actual circumstances described above, and an object thereof is to provide a sulfuric acid adding facility capable of increasing the maximum capacity and working rate of a sulfuric acid supply pump equipped to the sulfuric acid adding facility in a sulfuric acid adding facility for adding sulfuric acid to an autoclave used in a leaching step in a high pressure nickel oxide ore acid leaching method and a method for operating the same.

Means for Solving the Problems

The present inventors have conducted intensive investigations to solve the problems described above. As a result, it has been found that it is possible to increase the maximum capacity of the sulfuric acid supply pump and to improve the working rate thereof by operating the pump which has been conventionally used as a spare machine among a plurality of sulfuric acid supply pumps installed in the sulfuric acid adding facility even during normal operation, thereby completing the present invention. In other words, the present invention provides the following.

(1) A first aspect of the present invention is a sulfuric acid adding facility for adding sulfuric acid to an autoclave used in a leaching step in a high pressure nickel oxide ore acid leaching method, which includes the same number (n+1) (n is an integer of 1 or more) of a plurality of sulfuric acid addition pipes for adding sulfuric acid into the autoclave and of a plurality of sulfuric acid supply pumps that are connected to the sulfuric acid addition pipes and supply sulfuric acid to the sulfuric acid addition pipes and in which each of a first to (n+1)th sulfuric acid supply pumps includes three or more diaphragms and the same number of discharge ports as the number of the diaphragms, discharge ports of more than half of three or more diaphragms of a kth (k is an integer from 1 to n+1) sulfuric acid supply pump are connected to a kth sulfuric acid addition pipe, and discharge ports of fewer than half of the three or more diaphragms are connected to sulfuric acid addition pipes other than the kth sulfuric acid addition pipe.

(2) A second aspect of the present invention is a method for operating a sulfuric acid adding facility for adding sulfuric acid to an autoclave used in a leaching step in a high pressure nickel oxide ore acid leaching method, in which the sulfuric acid adding facility includes the same number (n+1) (n is an integer of 1 or more) of a plurality of sulfuric acid addition pipes for adding sulfuric acid into the autoclave and of a plurality of sulfuric acid supply pumps that are connected to the sulfuric acid addition pipes and supply sulfuric acid to the sulfuric acid addition pipes, each of a first to (n+1)th sulfuric acid supply pumps includes three or more diaphragms and the same number of discharge ports as the number of the diaphragms, discharge ports of more than half of three or more diaphragms of a kth (k is an integer from 1 to n+1) sulfuric acid supply pump are connected to a kth sulfuric acid addition pipe, discharge ports of fewer than half of the three or more diaphragms are connected to sulfuric acid addition pipes other than the kth sulfuric acid addition pipe, at the time of normal operation of the sulfuric acid adding facility, more than half of the three or more diaphragms are operated and fewer than half of the three or more diaphragms are stopped at each of the first to (n+1)th sulfuric acid supply pumps, and sulfuric acid discharged from a discharge port of an operating diaphragm among the three or more diaphragms of the kth sulfuric acid supply pump is added into the autoclave via the kth sulfuric acid addition pipe.

(3) A third aspect of the present invention is the method for operating a sulfuric acid adding facility according the second aspect, in which at the time when operation of any one of the plurality of sulfuric acid supply pumps stops due to maintenance and inspection and the like, a kth sulfuric acid supply pump is put in a stopped state by stopping more than half of three or more diaphragms of the kth sulfuric acid supply pump in a state in which sulfuric acid supply pumps other than the kth sulfuric acid supply pump of which working is to be stopped are operated, and in the sulfuric acid supply pumps other than the kth sulfuric acid supply pump in the stopped state, fewer than half of the three or more diaphragms of the sulfuric acid supply pumps other than the kth sulfuric acid supply pump of which working is to be stopped are operated and sulfuric acid is added into the autoclave via a sulfuric acid pipe to which discharge ports of the fewer than half of the diaphragms are connected.

Effects of the Invention

According to the present invention, it is possible to increase the maximum capacity and working rate of the sulfuric acid supply pump installed in the sulfuric acid adding facility. In addition, this makes it possible to perform efficient operation of the wet nickel oxide ore wet smelting process as a whole.

BRIEF DESCRIPTION OF THE DRAWINGS

FIG. 7 is a configuration diagram illustrating a state (opened and closed state of valve) when a sulfuric acid supply pump is stopped for maintenance and inspection and the like.

Figure 1:
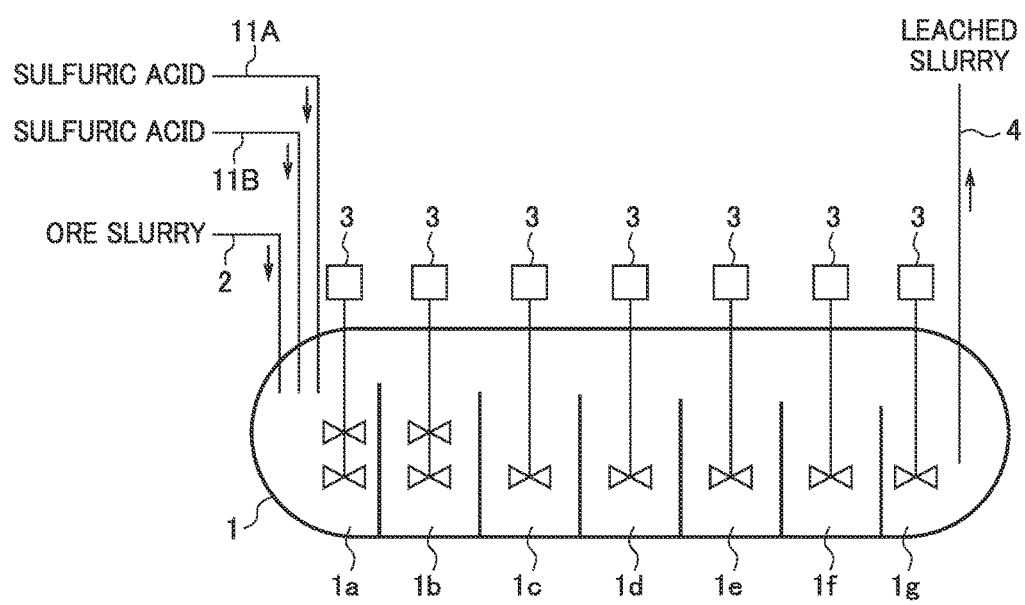
FIG. 1 is a diagram illustrating the configuration of an autoclave and a sulfuric acid addition pipe through which sulfuric acid is added to the autoclave.

PREFERRED MODE FOR CARRYING OUT
THE INVENTION

Hereinafter, specific embodiments (hereinafter referred to as the "present embodiments") of the present invention will be described in detail in the following order with reference to the drawings. Incidentally, the present invention is not limited to the following embodiments, and various modifications are possible without changing the gist of the present invention.
1. Nickel Oxide Ore Wet Smelting Method
2. Sulfuric Acid Adding Facility
3. Method for Operating Sulfuric Acid Adding Facility
3-1. Operation Method at Time of Normal Operation
3-2. Operation Method at Time of Stopping Operation of Sulfuric Acid Supply Pump
«1. Nickel Oxide Ore Wet Smelting Method»

The sulfuric acid adding facility according to the present embodiment is a sulfuric acid adding facility for adding sulfuric acid to an autoclave used in a leaching step in a nickel oxide ore wet smelting method using a high pressure acid leaching treatment. Hereinafter, the sulfuric acid adding facility and the operation method therefor will be specifically described, but the overview of the nickel oxide ore wet smelting method by a high pressure acid leaching method will be described prior to the description thereof.

The nickel oxide ore wet smelting method is a wet smelting method in which nickel and cobalt are leached out and recovered from nickel oxide ore by using a high pressure acid leaching method (HPAL method). This nickel oxide ore wet smelting method includes a leaching step S1 in which sulfuric acid is added to a slurry of nickel oxide ore and the slurry is subjected to a leaching treatment at a high temperature and a high pressure, a solid-liquid separation step S2 in which the residue is separated from the leached slurry to obtain a leachate containing nickel and cobalt, a neutralization step S3 in which the pH of the leachate is adjusted and the impurity element in the leachate is separated as a neutralized sediment to obtain a neutralized final liquid, and a sulfidization step (nickel recovery step) S4 in which a sulfidizing agent such as hydrogen sulfide gas is added to the neutralized final liquid to form a mixed sulfide containing nickel and cobalt.

[Leaching Step]

In the leaching step S1, sulfuric acid is added to a slurry (ore slurry) of nickel oxide ore and the mixture is stirred under conditions of a temperature of about from 230° C. to 270° C. and a pressure of about from 3 MPa to 5 MPa by using an autoclave (high temperature pressurized container) to form a leached slurry composed of a leach residue and a leachate.

Examples of the nickel oxide ore may mainly include so-called laterite ores such as limonite ore and saprolite ore. The nickel content in the laterite ore is usually from 0.8 to 2.5% by weight, and nickel is contained as a hydroxide or a magnesium silicate mineral. In addition, the content of iron is from 10 to 50% by weight, iron is mainly in the form of a trivalent hydroxide (goethite), but divalent iron is partly contained in the magnesium silicate mineral. In addition, in the leaching step S1, an oxide ore containing valuable metals such as nickel, cobalt, manganese, and copper, for example, reserves of manganese nodules on the deep ocean floor are used in addition to such laterite ore.

In the leaching treatment in this leaching step S1, for example, leaching reactions and high temperature thermal hydrolysis reactions represented by the following Formulas (i) to (v) take place and the leaching out of nickel, cobalt, and the like as a sulfate and the immobilization of iron sulfate leached out as hematite are performed. However, immobilization of iron ions does not proceed to completion, and the liquid portion of the leached slurry to be obtained usually contains divalent and trivalent iron ions in addition to nickel, cobalt, and the like. Incidentally, in this leaching step S1, it is preferable to adjust the pH of the leachate to be obtained to from 0.1 to 1.0 from the viewpoint of the filtration property of the leach residue which is generated in the solid-liquid separation step S2 of the next step and contains hematite.

Leaching Reaction

$$MO + H_2SO_4 \Rightarrow MSO_4 + H_2O \qquad (i)$$

(Incidentally, M in Formula (i) represents Ni, Co, Fe, Zn, Cu, Mg, Cr, Mn, or the like)

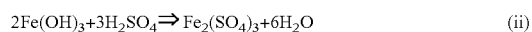
$$2Fe(OH)_3 + 3H_2SO_4 \Rightarrow Fe_2(SO_4)_3 + 6H_2O \qquad (ii)$$

$$FeO + H_2SO_4 \Rightarrow FeSO_4 + H_2O \qquad (iii)$$

High Temperature Thermal Hydrolysis Reaction

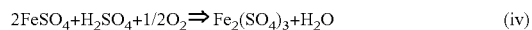
$$2FeSO_4 + H_2SO_4 + 1/2 O_2 \Rightarrow Fe_2(SO_4)_3 + H_2O \qquad (iv)$$

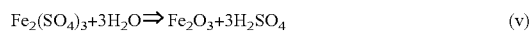
$$Fe_2(SO_4)_3 + 3H_2O \Rightarrow Fe_2O_3 + 3H_2SO_4 \qquad (v)$$

The amount of sulfuric acid added to the autoclave charged with the ore slurry in the leaching step S1 described above is not particularly limited, but an excessive amount is used so that iron in the ore is leached out. For example, it is from 300 kg to 400 kg per 1 ton of ore.

Meanwhile, the sulfuric acid adding facility according to the present embodiment is a facility for adding sulfuric acid to the autoclave used in this leaching step S1 although it will be described in detail later. FIG. 1 is a diagram illustrating the overview of an autoclave 1 and the configuration of a sulfuric acid addition pipe (sulfuric acid addition line) 11 through which sulfuric acid is added to the autoclave 1. As illustrated in FIG. 1, the autoclave 1 is not particularly limited but it is divided into a plurality of compartments (seven compartments 1a to 1g in the example of FIG. 1), and sulfuric acid for leaching out nickel and the like is added to a compartment 1a via the sulfuric acid addition pipe 11 as well as ore slurry is charged into the compartment 1a via the ore slurry charging pipe 2. The ore slurry and sulfuric acid thus charged are sequentially transferred from the compartment 1a toward a compartment 1g and subjected to the leaching treatment in each compartment while being stirred by a stirrer 3. After the stirring treatment in the compartment 1g is completed, the leached slurry thus obtained is discharged via the leached slurry discharge pipe 4 and then transferred to the solid-liquid separation step S2.

As illustrated in FIG. 1, the sulfuric acid adding facility according to the present embodiment is equipped with, for example, two sulfuric acid addition pipes 11A and 11B. In addition, this sulfuric acid adding facility is equipped with a sulfuric acid supply pump consisting of a diaphragm pump for supplying sulfuric acid to the sulfuric acid addition pipe 11. In the sulfuric acid adding facility according to the present embodiment, it is possible to improve the maximum capacity and working rate of the sulfuric acid supply pump and to perform efficient treatment of the nickel oxide ore wet smelting process as a whole by stabilizing the leaching rate of nickel and the amount of the chemicals (neutralizer and the like) added in the subsequent steps. Details will be described later.

[Solid-Liquid Separation Step]

In the solid-liquid separation step S2, the leached slurry formed in the leaching step S1 is washed in multiple stages to obtain a leachate containing nickel and cobalt and a leach residue.

In this solid-liquid separation step S2, the leached slurry is subjected to a solid-liquid separation treatment using a solid-liquid separation device such as a thickener after being mixed with the washing liquid. Specifically, first, the slurry is diluted with the washing liquid, and then the leach residue in the slurry is concentrated as the settlings of a thickener. This makes it possible to decrease the amount of nickel attached to the leach residue according to the degree of dilution. In the actual operation, it is possible to achieve an improvement of the recovery rate of nickel and cobalt by continuously using a thickener having such a function in multiple stages.

[Neutralization Step]

In the neutralization step S3, a neutralizer such as magnesium oxide or calcium carbonate is added so as to adjust the pH to 4 or less while suppressing the oxidation of the leachate and a neutralized sediment slurry containing trivalent iron and a mother liquid for nickel recovery (neutralized final liquid) are obtained.

Specifically, in the neutralization step S3, a neutralizer such as calcium carbonate is added to the leachate so that the pH of the neutralized final liquid to be obtained becomes 4 or less, preferably from 3.0 to 3.5, more preferably from 3.1 to 3.2 while the oxidation of the separated leachate is suppressed, and the neutralized final liquid as the source of the mother liquid for nickel recovery and the neutralized sediment slurry containing trivalent iron as an impurity element are formed. In the neutralization step S3, by subjecting the leachate to the neutralization treatment in this manner, the impurities such as trivalent iron ions and aluminum ions remaining in the solution are removed as a neutralized sediment as well as the excess acid used in the leaching treatment by the high pressure acid leaching method is neutralized to generate a neutralized final liquid.

[Sulfidization Step (Nickel Recovery Step)]

In the sulfidization step S4, a sulfidizing agent such as hydrogen sulfide gas or the like is blown into the neutralized final liquid which is the mother liquid for nickel recovery and a sulfide (nickel-cobalt mixed sulfide) containing nickel and cobalt and a small amount of impurity components and a poor liquid (liquid after sulfidization) in which the nickel concentration is stabilized at a low level are generated. Incidentally, in a case in which zinc is contained in the neutralized final liquid, zinc can be selectively separated as a sulfide prior to the separation of nickel and cobalt as a sulfide.

In this sulfidization step S4, the slurry of the mixed sulfide of nickel and cobalt is subjected to the sedimentation separation treatment using a sedimentation separation apparatus such as a thickener, and only the mixed sulfide is separated and recovered from the bottom portion of the thickener. Meanwhile, the aqueous solution component is recovered as a poor liquid by allowing it to overflow.

«2. Sulfuric Acid Adding Facility»

The sulfuric acid adding facility according to the present embodiment is a facility for adding sulfuric acid to the autoclave used in the leaching step in the high pressure nickel oxide ore acid leaching method described above.

Specifically, the sulfuric acid adding facility according to the present embodiment is equipped with the same number (n+1) (n is an integer of 1 or more) of a plurality of sulfuric acid addition pipes through which sulfuric acid is added into the autoclave and of a plurality of sulfuric acid supply pumps which are connected to the sulfuric acid addition pipes and supply sulfuric acid to the sulfuric acid addition pipes. Moreover, in this sulfuric acid adding facility, each of the first to (n+1)th sulfuric acid supply pumps has three or more diaphragms and the same number of discharge ports as that of the diaphragms, the discharge ports of more than half of the three or more diaphragms of the kth (k is an integer from 1 to n+1) sulfuric acid supply pump are connected to the kth sulfuric acid addition pipe, and meanwhile, the discharge ports of fewer than half of the three or more diaphragms are connected to the sulfuric acid addition pipes other than the kth sulfuric acid addition pipe.

(Specific Configuration of Sulfuric Acid Adding Facility: Case of Two Systems)

Figure 2:
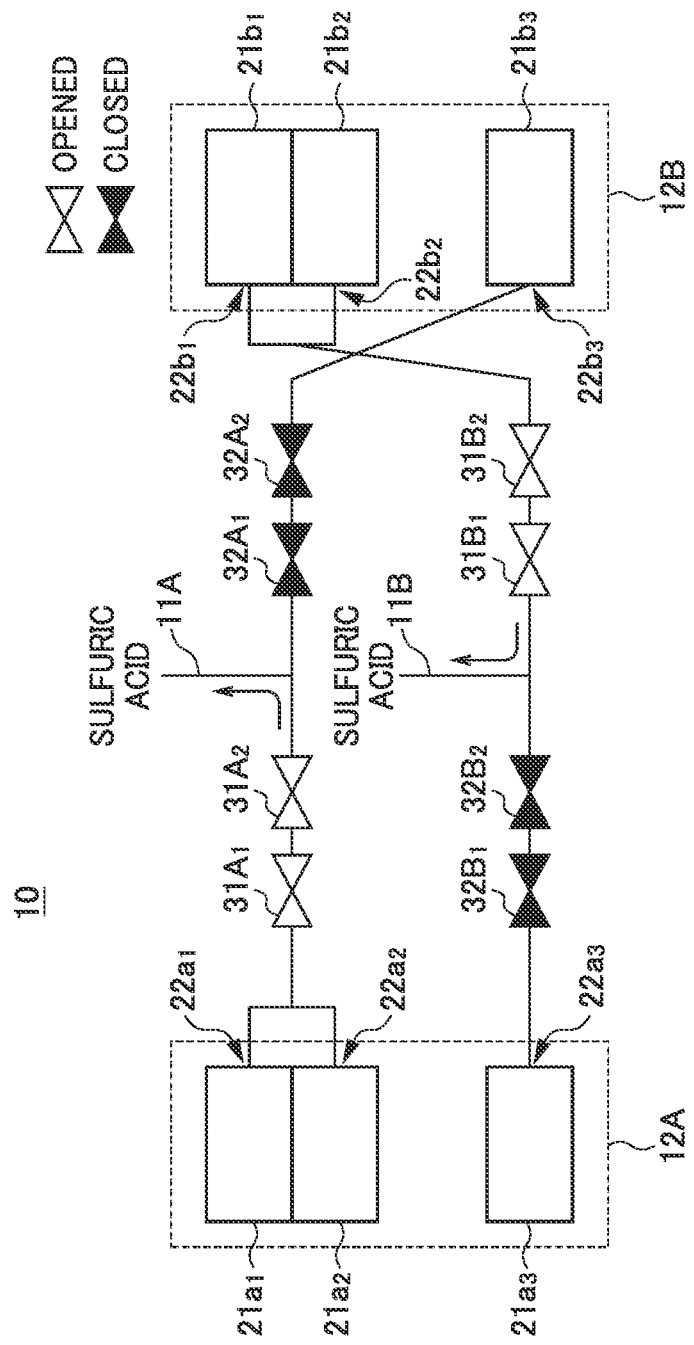
FIG. 2 is a diagram illustrating an example of a specific configuration of a sulfuric acid adding facility (two systems).

FIG. 2 is a diagram illustrating an example of the configuration diagram of a sulfuric acid adding facility. In FIG. 2, an example of a sulfuric acid adding facility 10 equipped with two sulfuric acid addition pipes 11 and two sulfuric acid supply pumps 12 (two systems: referred to as a system "A" and a system "B") is illustrated.

Incidentally, in the following description, the first sulfuric acid addition pipe 11 (system A) is appropriately referred to as the "sulfuric acid addition pipe 11A" and the second sulfuric acid addition pipe 11 (system B) is appropriately referred to as the "sulfuric acid addition pipe 11B". In addition, the first sulfuric acid supply pump 12 (system A) is referred to as the "sulfuric acid supply pump 12A" and the second sulfuric acid supply pump 12 (system B) is referred to as the "sulfuric acid supply pump 12B".

The sulfuric acid addition pipe 11 serves as a flow path of sulfuric acid sent from a sulfuric acid supply tank (not illustrated) or the like by the sulfuric acid supply pump 12 to be described later. The sulfuric acid that has passed through the sulfuric acid addition pipe 11 is added into the autoclave 1 for leaching the nickel oxide ore at a high temperature and a high pressure.

This sulfuric acid addition pipe 11 is provided with a plurality of valves (flow valves) 31 and 32. In the sulfuric acid addition pipe 11, ON/OFF of sulfuric acid flow is controlled by the valves 31 and 32 and the addition of sulfuric acid into the autoclave 1 is adjusted by the valves 31 and 32. Incidentally, the valves 31 and 32 may be either of a manual type that is opened and closed by the manipulator's hand or an automatic type that is opened and closed by computer control.

The sulfuric acid supply pump 12 is a pump for sending sulfuric acid from a sulfuric acid supply tank that is not illustrated to the sulfuric acid addition pipe 11 described above, and it consists of a diaphragm pump. Here, the diaphragm pump is a pump that sucks and discharges a fluid by reciprocating a membrane. For example, the diaphragm pump is configured to expand and contract a membrane via a motion of a cylinder driven by a motor to send a fluid. Alternatively, it has a structure housed in a hermetically sealed state by a flange member and is pressurized or decompressed by air pressure, and it is configured such that the fluid is sent by the reciprocating motion of the membrane caused by the contraction thereof due to pressurization and expansion thereof due to decompression.

The sulfuric acid supply pump 12 consisting of this diaphragm pump includes a diaphragm (membrane) 21 and a discharge port (pump head) 22 for discharging fluid sulfuric acid.

As described above, the sulfuric acid adding facility 10 is equipped with two sulfuric acid addition pipes 11A and 11B for adding sulfuric acid into the autoclave 1 and two sulfuric acid supply pumps 12A and 12B that are connected to the sulfuric acid addition pipe 11 and supply sulfuric acid to the sulfuric acid addition pipes 11A and 11B thereof.

In this sulfuric acid adding facility 10, each of the first sulfuric acid supply pump 12A and the second sulfuric acid supply pump 12B includes three diaphragms 21 and the same number of discharge ports 22 as that of the diaphragms 21. Incidentally, three discharge ports 22a of three diaphragms 21a of the first sulfuric acid supply pump 12A are respectively referred to as "discharge ports $22a_1$ to $22a_3$" and three discharge ports 22b of three diaphragms 21b of the second sulfuric acid supply pump 12B are respectively referred to as "discharge ports $22b_1$ to $22b_3$".

Moreover, the discharge ports $22a_1$ and $22a_2$ of more than half of the three diaphragms 21a, namely the two diaphragms $21a_1$ and $21a_2$ of the first sulfuric acid supply pump 12A are connected to the first sulfuric acid addition pipe 11A. Meanwhile, the discharge port $22a_3$ of the remaining fewer than half of the three diaphragms 21a, namely the remaining one diaphragm $21a_3$ is connected to the second sulfuric acid addition pipe 11B other than the first sulfuric acid addition pipe 11A.

In the same manner, the discharge ports $22b_1$ and $22b_2$ of the more than half of the three diaphragms 21b, namely the two diaphragms $21b_1$ and $21b_2$ of the second sulfuric acid supply pump 12B are connected to the second sulfuric acid addition pipe 11B. Meanwhile, the discharge port $22b_3$ of the remaining fewer than half of the three diaphragms 21b, namely the remaining one diaphragm $21b_3$ is connected to the first sulfuric acid addition pipe 11A other than the second sulfuric acid addition pipe 11B.

(Specific Configuration of Sulfuric Acid Adding Facility: Case of Three Systems)

Figure 3:
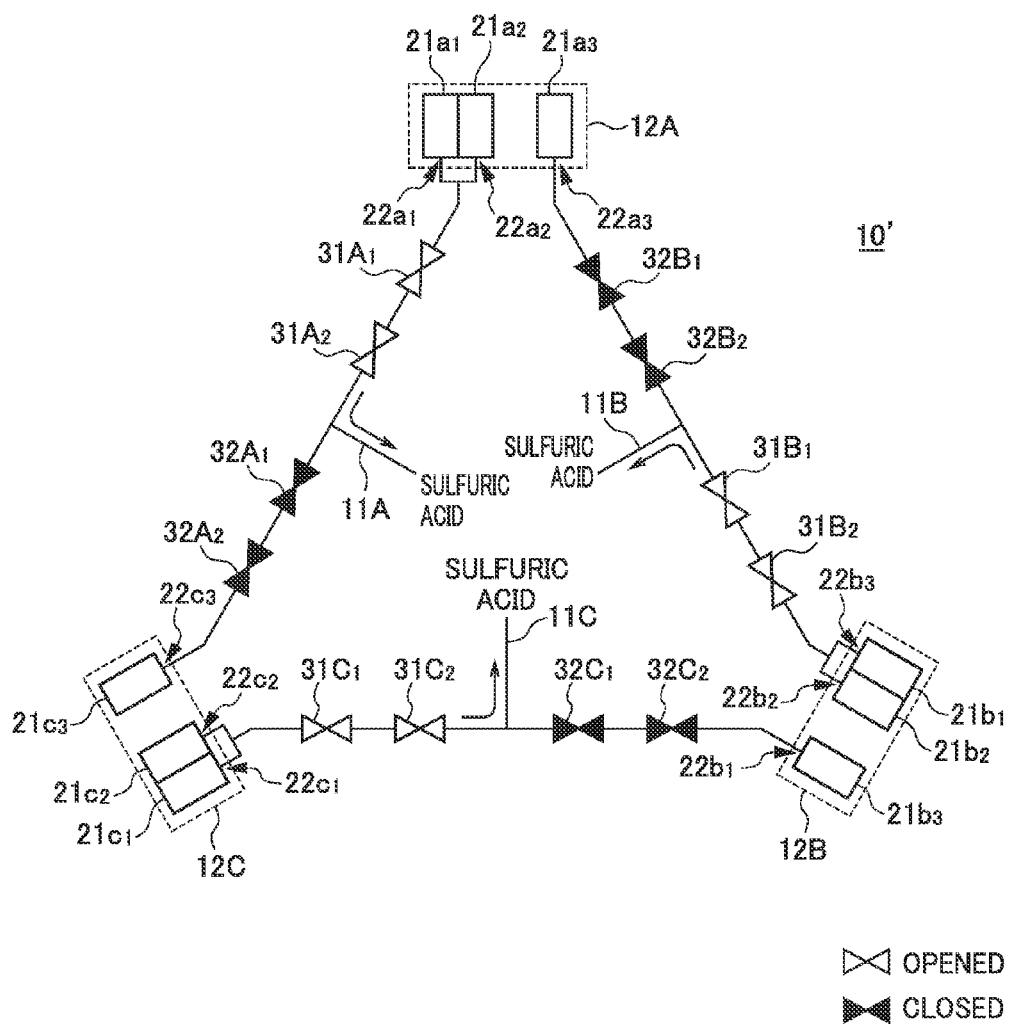
FIG. 3 is a diagram illustrating an example of a specific configuration of a sulfuric acid adding facility (three systems).

In addition, FIG. 3 is a diagram illustrating an example of the configuration diagram of a sulfuric acid adding facility, and an example of a sulfuric acid adding facility 10' equipped with three sulfuric acid addition pipes 11 and three sulfuric acid supply pumps 12 (three systems: referred to as system "A", system "B", and system "C") is illustrated in FIG. 3.

In the sulfuric acid adding facility 10' equipped with three systems of sulfuric acid addition pipes 11 and sulfuric acid supply pumps 12, each of the first sulfuric acid supply pump 12A, the second sulfuric acid supply pump 12B, and the third sulfuric acid supply pump 12C includes three diaphragms 21 and the same number of discharge ports 22 as that of the diaphragms 21. Three discharge ports 22a of three diaphragms 21a of the first sulfuric acid supply pump 12A are respectively referred to as "discharge ports $22a_1$ to $22a_3$", three discharge ports 22b of three diaphragms 21b of the second sulfuric acid supply pump 12B are respectively referred to as "discharge ports $22b_1$ to $22b_3$", and three discharge ports 22c of the three diaphragms 21c of the third sulfuric acid supply pump 12C are respectively referred to as "discharge ports $22c_1$ to $22c_3$".

Moreover, the discharge ports $22a_1$ and $22a_2$ of more than half of the three diaphragms 21a, namely the two diaphragms $21a_1$ and $21a_2$ of the first sulfuric acid supply pump 12A are connected to the first sulfuric acid addition pipe 11A. Meanwhile, the discharge port $22a_3$ of the remaining fewer than half of the three diaphragms 21a, namely the remaining one diaphragm $21a_3$ is connected to the second sulfuric acid addition pipe 11B other than the first sulfuric acid addition pipe 11A.

In the same manner, the discharge ports $22b_1$ and $22b_2$ of more than half of the three diaphragms 21b, namely the two diaphragms $21b_1$ and $21b_2$ of the second sulfuric acid supply pump 12B are connected to the second sulfuric acid addition pipe 11B. Meanwhile, the discharge port $22b_3$ of the remaining fewer than half of the three diaphragms 21b, namely the remaining one diaphragm $21b_3$ is connected to the third sulfuric acid addition pipe 11C other than the second sulfuric acid addition pipe 11B.

In the same manner, the discharge ports $22c_1$ and $22c_2$ of more than half of the three diaphragms 21c, namely the two diaphragms $21c_1$ and $21c_2$ of the third sulfuric acid supply pump 12C are connected to the third sulfuric acid addition pipe 11C. Meanwhile, the discharge port $22c_3$ of the remaining fewer than half of the three diaphragms 21c, namely the remaining one diaphragm $21c_3$ is connected to the first sulfuric acid addition pipe 11A other than the third sulfuric acid addition pipe 11C.

Incidentally, the configurations of the sulfuric acid adding facilities 10 and 10' in a case in which the number of systems is two and a case in which the number of systems is three have been described above, but the number of systems is not limited to these cases, and the sulfuric acid adding facilities 10 and 10' can be equipped with four or more systems of sulfuric acid addition pipes 11 and four or more systems of sulfuric acid supply pumps 12 according to the amount of nickel oxide ore treated, the amount of sulfuric acid added, and the like. For example, even in a facility equipped with four or more systems of sulfuric acid addition pipes 11 and four or more systems of sulfuric acid supply pumps 12, the fourth, fifth, . . . , (n+1)th sulfuric acid supply pump 12 is configured in the same manner, more than half of the discharge ports 22 are connected to the kth sulfuric acid addition pipe 11, and the remaining fewer than half of the discharge ports 22 are connected to the sulfuric acid addition pipe 11 other than the kth sulfuric acid addition pipe 11. The sulfuric acid addition pipe 11 to which the discharge ports 22 of the remaining fewer than half of the diaphragms of the kth sulfuric acid supply pump are connected is connected so as not to overlap with the sulfuric acid addition pipe 11 to which the discharge ports 22 of the remaining fewer than half of the diaphragms of the sulfuric acid supply pump other than the kth sulfuric acid supply pump are connected.
(Comparison with Conventional Sulfuric Acid Adding Facility)

Figure 8:
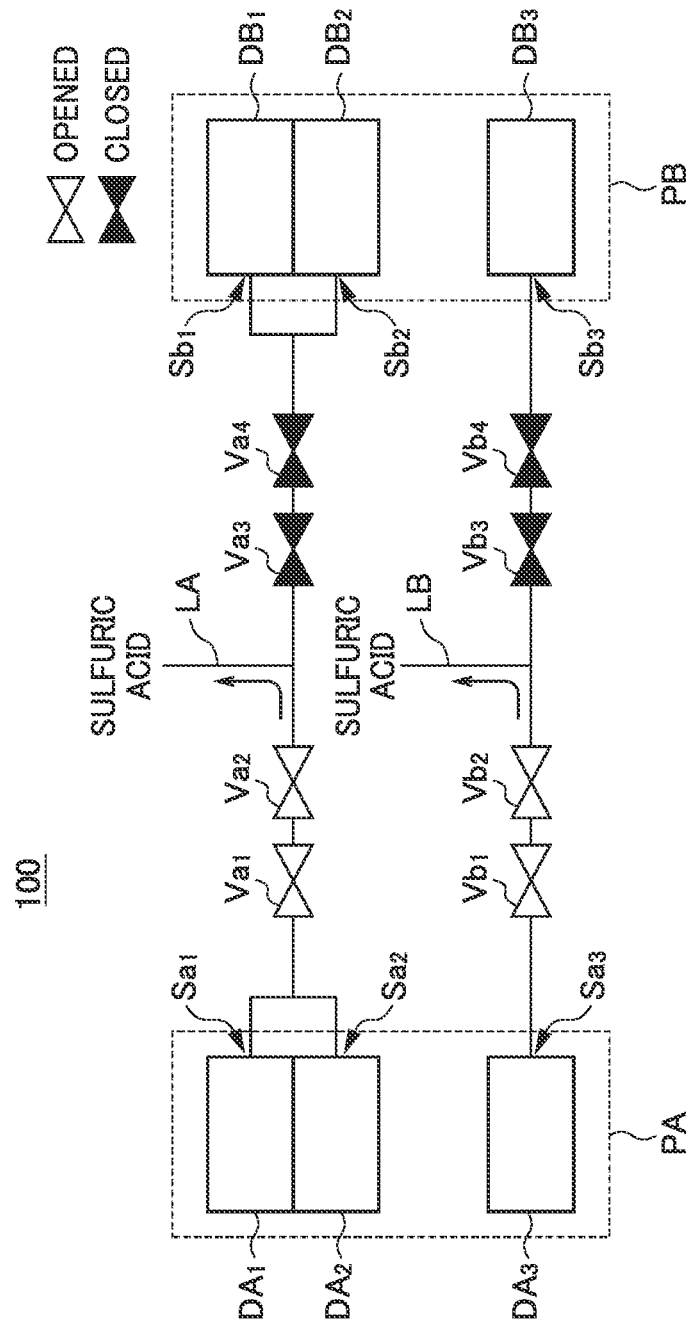
FIG. 8 is a diagram illustrating a specific configuration of a conventional sulfuric acid adding facility.

Here, as illustrated in FIG. 8, in a conventional sulfuric acid adding facility 100, sulfuric acid is added to a sulfuric acid addition pipe LA from two discharge ports of a discharge port $Sa_1$ and a discharge port $Sa_2$ of a first sulfuric acid supply pump PA in total and sulfuric acid is added to a sulfuric acid addition pipe LB from one discharge port of a discharge port $Sa_3$ of the first sulfuric acid supply pump PA. Hence, a conventional sulfuric acid adding facility 100 is configured so as to be able to add sulfuric acid to the sulfuric acid addition pipe LA in an amount to be about twice the amount which can be added to the sulfuric acid addition pipe LB. Two sulfuric acid supply pumps (a first sulfuric acid supply pump PA and a second sulfuric acid supply pump PB) are commonly connected to the sulfuric acid addition pipe LA and the sulfuric acid addition pipe LB, valves $Va_1$ and $Va_2$ and $Vb_1$ and $Vb_2$ on the first sulfuric acid supply pump PA side are put in an open state and valves $Va_3$ and $Va_4$ and $Vb_3$ and $Vb_4$ on the second sulfuric acid supply pump PB side are put in a closed state, for example, in the case of using the first sulfuric acid supply pump PA.

In a sulfuric acid adding facility for adding sulfuric acid into an autoclave used in the leaching treatment at a high temperature and high pressure, the sulfuric acid supply pumps PA and PB of the constituents thereof are used under severe conditions. Hence, the frequency of maintenance and inspection and the occurrence of problems increase in the sulfuric acid supply pumps PA and PB. For this reason, in order to minimize the shutdown time at the time of maintenance and inspection and occurrence of problems, two pumps, one sulfuric acid supply pump for normal use (for example, the first sulfuric acid supply pump PA) and one spare sulfuric acid supply pump (for example, the second sulfuric acid supply pump PB), are prepared in total as described above.

During normal operation, the first sulfuric acid supply pump (for example, the first sulfuric acid supply pump PA) is in a working state and the second sulfuric acid supply pump (for example, the second sulfuric acid supply pump PB), i.e. the spare machine, is in a standby state. Meanwhile, when operation needs to be stopped for performing maintenance and inspection and the like, the operating sulfuric acid supply pump PA is temporarily stopped (after the addition of sulfuric acid to the autoclave 1 is stopped), the standby state of the sulfuric acid supply pump PB is switched to an operating state, and the first sulfuric acid supply pump PA is put in a standby state and subjected to maintenance and inspection. For this reason, the working rate of the sulfuric acid supply pumps PA and PB installed in the conventional sulfuric acid adding facility 100 is only 50% since a spare machine is required.

On the other hand, the design load of the operating sulfuric acid supply pump is designed to be close to the maximum capacity of the pump in order to suppress capital investment, and the sulfuric acid supply pump is operated at a value close to the maximum ability in actual operation as well. Furthermore, in the leaching treatment in the nickel oxide ore wet smelting method, sulfuric acid is consumed for leaching out the impurities that are easily leached out and the leaching rate of the target metals (nickel and cobalt) deteriorates in a case in which the quality of impurities that are typified by magnesium and contained in the ore to be treated is high. In this case, the leaching rate is secured by increasing the amount of sulfuric acid added, that is, the load of the sulfuric acid supply pump is further increased to cope with it.

However, in the case of operating the pump at a value extremely close to the maximum capacity due to an increase in the load of the sulfuric acid supply pump, the possibility of occurrence of problems such as the generation of vibrations transmitted to the pipes and pumps, abnormal problems in the diaphragm check valve and the hydraulic safety valve, and problems such as sulfuric acid leakage from the connected portion of the dampener (pulsating pressure relaxation apparatus) is remarkably high. In actual operation as well, an increase in problems such as these is more remarkable as the sulfuric acid supply pump is operated at a higher load.

In such circumstances, the present inventors have investigated to increase the maximum capacity of the sulfuric acid supply pump and to improve the working rate through a decrease in the load of the sulfuric acid supply pump by operating the spare machine of the sulfuric acid supply pump installed in the sulfuric acid adding facility during normal operation as well. As a result, it has been found that it is possible to improve the maximum capacity and working rate of the sulfuric acid supply pump, for example, by configuring the sulfuric acid addition pipe 11 and the sulfuric acid supply pump 12 as in the sulfuric acid adding facility 10 illustrated in FIGS. 2 and 3.

Specifically, for example, as in the sulfuric acid adding facility 10 which is illustrated in FIG. 2 and consists of two systems, sulfuric acid is supplied to the first sulfuric acid addition pipe 11A by using the discharge ports $22a_1$ and $22a_2$ of more than half of the three or more diaphragms 21*a*, namely the two diaphragms $21a_1$ and $21a_2$ in the first sulfuric acid supply pump 12A. Meanwhile, sulfuric acid is supplied to the second sulfuric acid addition pipe 11B by using the discharge ports $22b_1$ and $22b_2$ of more than half of the three or more diaphragms 21*b*, namely the two diaphragms $21b_1$ and $21b_2$ in the second sulfuric acid supply pump 12B.

In addition, for example, as in the sulfuric acid adding facility 10' which is illustrated in FIG. 3 and consists of three systems, sulfuric acid is supplied to the first sulfuric acid addition pipe 11A by using the discharge ports $22a_1$ and $22a_2$ of more than half of the three or more diaphragms 21*a*, namely the two diaphragms $21a_1$ and $21a_2$ in the first sulfuric acid supply pump 12A. Meanwhile, sulfuric acid is supplied to the second sulfuric acid addition pipe 11B by using the discharge ports $22b_1$ and $22b_2$ of more than half of the three or more diaphragms 21*b*, namely the two diaphragms $21b_1$ and $21b_2$ in the second sulfuric acid supply pump 12B. Furthermore, sulfuric acid is supplied to the third sulfuric acid addition pipe 11C by using the discharge ports $22c_1$ and $22c_2$ of more than half of the three or more diaphragms 21*b*, namely the two diaphragms $21c_1$ and $21c_2$ in the third sulfuric acid supply pump 12C.

As described above, each of the sulfuric acid supply pumps 12 is configured such that the discharge ports 22 of more than half of the three or more diaphragms 21 are connected to the separate sulfuric acid addition pipes 11 and sulfuric acid can be thus added through the respective sulfuric acid addition pipes (the first sulfuric acid addition pipe 11A, the second sulfuric acid addition pipe 11B, and the third sulfuric acid addition pipe 11C). This makes it possible to operate two or more sulfuric acid supply pumps including the sulfuric acid supply pump that has been conventionally used as a spare machine in parallel and thus to increase the working rate as well as to improve the maximum capacity of the pump.

In addition, it is possible to perform extremely efficient operation without stopping the addition of sulfuric acid to the autoclave 1 even in the case in which one sulfuric acid supply pump 12A (12B, or 12C) stops operation at the time of the maintenance and inspection and the occurrence of problems thereof. Incidentally, although the manipulation at the time when one sulfuric acid supply pump 12A (12B, or 12C) stops operation due to maintenance and inspection and the like will be described in detail later, sulfuric acid is supplied to the second sulfuric acid addition pipe 11B by using the discharge port $22a_3$ of one diaphragm $21a_3$, which is fewer than half of the three or more diaphragms 21a in the first sulfuric acid supply pump 12A in a case in which the sulfuric acid supply pump 12 is not the target of maintenance and inspection, for example, the first sulfuric acid supply pump 12A is not the target of maintenance and inspection. In such a case, the shortage of the amount of sulfuric acid added can be minimized although the amount of sulfuric acid added to the autoclave decreases by about 25% only during the time to cope with the maintenance and inspection and the problems that have occurred.

《3. Method for Operating Sulfuric Acid Adding Facility》

Hereinafter, the method for operating the sulfuric acid adding facility according to the present embodiment will be described by dividing into an operation method at the time of normal operation and an operation method at the time when a predetermined sulfuric acid supply pump stops operation due to maintenance and inspection and the like when using the sulfuric acid adding facility 10 of which an example is illustrated in FIG. 2 described above.

<3-1. Operation Method at Time of Normal Operation>

As illustrated in FIG. 2, the sulfuric acid adding facility 10 according to the present embodiment is equipped with two sulfuric acid addition pipes 11A and 11B and two sulfuric acid supply pumps 12A and 12B. Moreover, the discharge ports $22a_1$ and $22a_2$ of the two diaphragms $21a_1$ and $21a_2$, which are more than half of the three diaphragms 21a of the first sulfuric acid supply pump 12A, are connected to the first sulfuric acid addition pipe 11A, meanwhile, the discharge port $22a_3$ of the remaining one diaphragm $21a_3$, which is fewer than half of the three diaphragms 21a, is connected to the second sulfuric acid addition pipe 11B. In the same manner, the discharge ports $22b_1$ and $22b_2$ of the two diaphragms $21b_1$ and $21b_2$, which are more than half of the three diaphragms 21b of the second sulfuric acid supply pump 12B, are connected to the second sulfuric acid addition pipe 11B, meanwhile, the discharge port $22b_3$ of the remaining one diaphragm $21b_3$, which is fewer than half of the three diaphragms 21b, is connected to the first sulfuric acid addition pipe 11A.

In such a sulfuric acid adding facility 10, at the time of normal operation, in each of the first sulfuric acid supply pump 12A and the second sulfuric acid supply pump 12B, the two diaphragms $21a_1$ and $21a_2$ ($21b_1$ and $21b_2$), which are more than half of the three diaphragms 21a (21b), are operated and the remaining one diaphragm $21a_3$ ($21b_3$), which is fewer than half thereof, is stopped.

Moreover, sulfuric acid is added into the autoclave from the discharge ports $22a_1$ and $22a_2$ ($22b_1$ and $22b_2$) of the operating diaphragms $21a_1$ and $21a_2$ ($21b_1$ and $21b_2$) via the sulfuric acid addition pipe 11 connected to the discharge port 22. Specifically, sulfuric acid to be discharged from the discharge ports $22a_1$ and $22a_2$ of the operating diaphragms $21a_1$ and $21a_2$ of the first sulfuric acid supply pump 12A is added into the autoclave 1 via the first sulfuric acid addition pipe 11A connected. Meanwhile, sulfuric acid to be discharged from the discharge ports $22b_1$ and $22b_2$ of the operating diaphragms $21b_1$ and $21b_2$ of the second sulfuric acid supply pump 12B is added into the autoclave 1 via the second sulfuric acid addition pipe 11B connected.

Upon this normal operation, before the start of the actual operation, the valves $31A_1$ and $31A_2$ installed in the first sulfuric acid addition pipe 11A connected to the two discharge ports 22, for example, the discharge ports $22a_1$ and $22a_2$ in the first sulfuric acid supply pump 12A described above are opened and, meanwhile, the valves $32B_1$ and $32B_2$ installed in the second sulfuric acid addition pipe 11B connected to the discharge port $22a_3$ are closed. Incidentally, the control of the opening and closing of the valves $31B_1$ and $31B_2$ and $32A_1$ and $32A2$ installed in the sulfuric acid addition pipes 11A and 11B connected to the second sulfuric acid supply pump 12B is also performed in the same manner. Incidentally, in FIG. 2, the opened and closed states of the valves 31 and 32 are such that the "opened" state is denoted by an outlined valve and the "closed" state is denoted by a black valve.

Thereafter, after priming of each of the first sulfuric acid supply pump 12A and the second sulfuric acid supply pump 12B is performed, the supply of sulfuric acid to the first sulfuric acid addition pipe 11A and the second sulfuric acid addition pipe 11B from the respective sulfuric acid supply pumps 12A and 12B is started.

Figure 4:
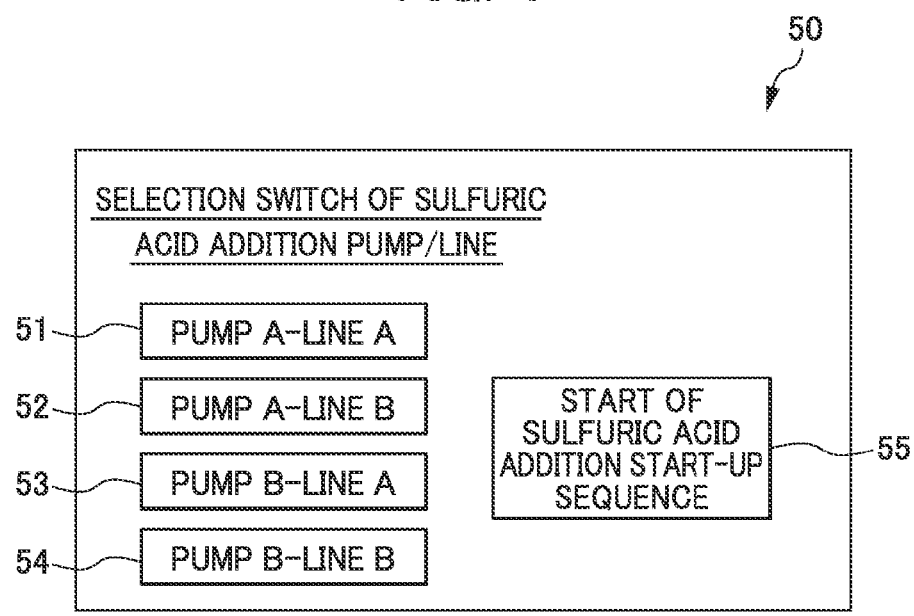
FIG. 4 is a diagram schematically illustrating an example of a manipulation panel on a DCS (distributed control system).

The manipulation at the time of normal operation can be automatically performed, for example, by manipulating a manipulation panel 50 on the DCS as an example of which is illustrated in FIG. 4. Specifically, at the time of normal operation, a selection switch 51 for "pump A-line A" is selected for the first sulfuric acid supply pump 12A, a selection switch 54 for "pump B-line B" is selected for the second sulfuric acid supply pump 12B, and a start button 55 of the sulfuric acid addition start-up sequence is pressed.

Incidentally, on this manipulation panel 50 illustrated in FIG. 4, the selection switch 51 for "pump A-line A" is a selection switch for the sequence to add sulfuric acid from the first sulfuric acid supply pump 12A via the first sulfuric acid addition pipe 11A as described above and the selection switch 52 for "pump A-line B" is a selection switch for the sequence to add sulfuric acid from the first sulfuric acid supply pump 12A via the second sulfuric acid addition pipe 11B. In addition, the selection switch 53 for "pump B-line A" is a sequence to add sulfuric acid from the second sulfuric acid supply pump 12B via the first sulfuric acid addition pipe 11A and the selection switch 54 for "pump B-line B" is a selection switch for the sequence to add sulfuric acid from the second sulfuric acid supply pump 12B via the second sulfuric acid addition pipe 11B as described above.

After both pumps of the first sulfuric acid supply pump 12A and the second sulfuric acid supply pump 12B are started, the pump speed is increased while adjusting the stroke of the discharge port 22 of the diaphragm 21 of the respective pumps 12A and 12B. In addition, the discharge port $22a_3$ of the first sulfuric acid supply pump 12A and the discharge port $22b_3$ of the second sulfuric acid supply pump 12B are not worked as a pump by setting the stroke to zero.

Figure 5:
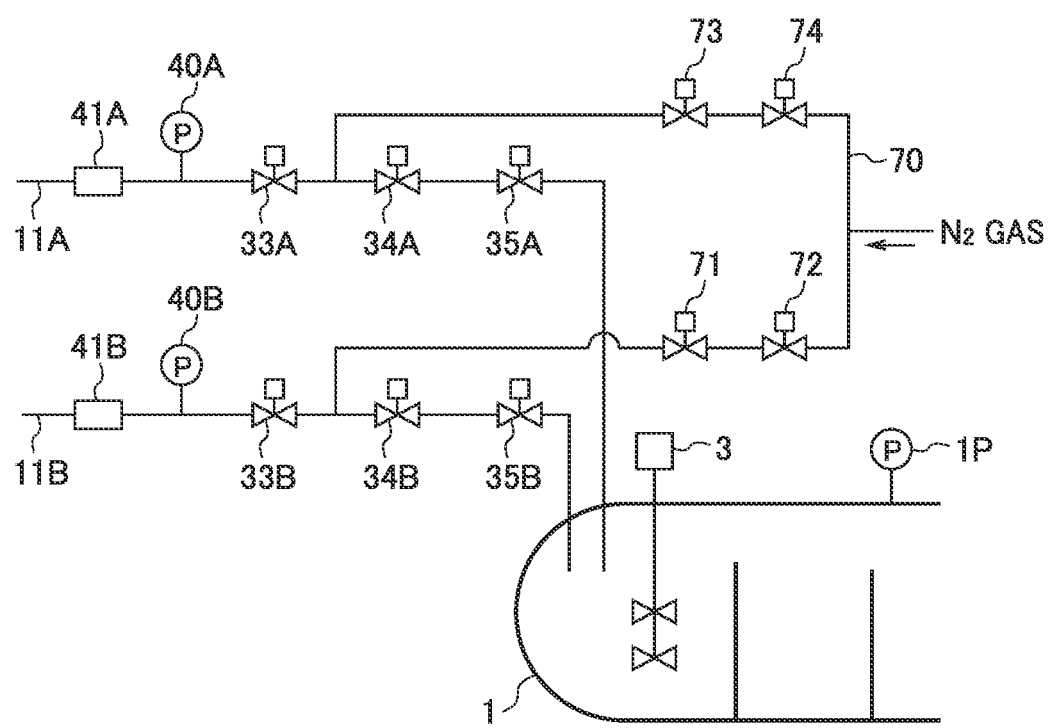
FIG. 5 is a diagram illustrating a specific piping configuration between an autoclave and a sulfuric acid addition pipe.

Here, with reference to the diagram which illustrates the configuration between the autoclave 1 and the sulfuric acid addition pipe 11 in FIG. 5, the opening and closing control of the valve provided in the sulfuric acid addition pipe 11 when adding sulfuric acid to the autoclave 1 is specifically described. As illustrated in FIG. 5, the sulfuric acid addition pipe 11A connected to the autoclave 1 is provided with, for example, three valves 33A, 34A, and 35A, a pressure gauge 40A for detecting the pressure in the pipe, and a flowmeter 41A for detecting the flow rate of sulfuric acid in the pipe. Incidentally, the sulfuric acid addition pipe 11B is also provided with valves, a pressure gauge, and a flowmeter in the same manner.

Figure 6:
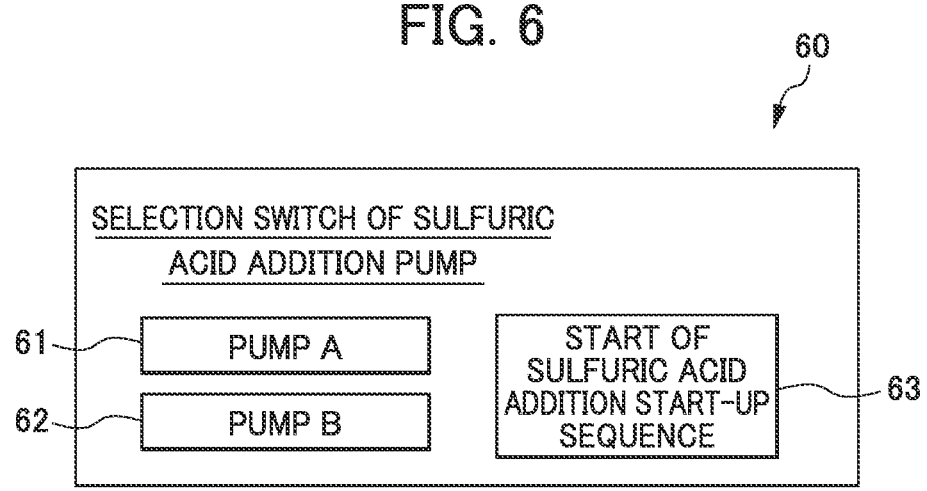
FIG. 6 is a diagram schematically illustrating an example of a manipulation panel on a DCS.

In the case of adding sulfuric acid to the autoclave 1 via the sulfuric acid addition pipe 11A as an example, before starting the addition of sulfuric acid, all the valves 33A, 34A, and 35A provided in the sulfuric acid addition pipe 11A are closed and the sulfuric acid supply pump 12A for supplying sulfuric acid to the sulfuric acid addition pipe 11A is stopped. Subsequently, when starting the addition of sulfuric acid to the autoclave 1, priming (air removal in the sulfuric acid addition pipe 11A) of the sulfuric acid supply pump 12A is first performed and it is confirmed whether or not the pressure in the sulfuric acid addition pipe 11A is, for example, from 500 kPag to 800 kPag by monitoring the pressure gauge 40A. Thereafter, when it is confirmed that the pressure is a predetermined pressure, a selection switch 61 of the sulfuric acid supply pump 12A between the sulfuric acid supply pumps 12A and 12B is selected and a start button 63 of the sulfuric acid addition start-up sequence is pressed, for example, by using a manipulation panel 60 on the DCS (distributed control system) illustrated in FIG. 6. Incidentally, on the manipulation panel 60 illustrated in FIG. 6, the selection switch 62 is a manipulation switch for operating the sulfuric acid supply pump 12B.

When operation of the sulfuric acid supply pump 12A is started by such manipulation, the pump speed is increased while adjusting the stroke of the sulfuric acid supply pump 12A, and the valves 33A and 34A provided in the sulfuric acid addition pipe 11A are opened after a predetermined time has elapsed. Incidentally, the flow rate of sulfuric acid in the sulfuric acid addition pipe 11A is appropriately detected by the flowmeter 41A. It is impossible to add sulfuric acid into the autoclave 1 unless the pressure of the sulfuric acid addition pipe 11A is higher than the pressure of the autoclave 1, thus the valve 35A is opened and the addition of sulfuric acid to the autoclave 1 is started after the difference between the value indicated by the pressure gauge 40A of the sulfuric acid addition pipe 11A and the value indicated by a pressure gauge 1P indicating the pressure of the autoclave 1 reaches a predetermined value (set value).

Incidentally, at the time of normal operation, the addition of sulfuric acid through the sulfuric acid addition pipe 11B is also performed by the operation of the sulfuric acid supply pump 12B as described above, but the opening and closing of the valve is performed and sulfuric acid is also added to the autoclave 1 through the sulfuric acid addition pipe 11B in the same manner as the sulfuric acid addition pipe 11A.

As described above, at the time of normal operation, sulfuric acid is added to the autoclave 1 from the first sulfuric acid supply pump 12A via the first sulfuric acid addition pipe 11A connected to the discharge ports $22a_1$ and $22a_2$ and sulfuric acid is added to the autoclave 1 from the second sulfuric acid supply pump 12B via the second sulfuric acid addition pipe 11B connected to the discharge ports $22b_1$ and $22b_2$. The maximum capacity of the sulfuric acid adding facility 10 in which such parallel operation of a plurality of pumps including a spare machine is possible is, for example, as follows as a designed value.

[Maximum capacity of pump in sulfuric acid adding facility 10]=[discharge port $22a_1$+discharge port $22a_2$ of first sulfuric acid supply pump 12$A$]+ [discharge port $22b_1$+discharge port $22b_2$ of second sulfuric acid supply pump 12$B$]

=26 m³/hr+26 m³/hr

=52 m³/hr

On the contrary, in the operation using the conventional sulfuric acid adding facility 100, namely the operation in which the spare machine (the second sulfuric acid supply pump PB) is in a stopped state and only the first sulfuric acid supply pump PA is worked as illustrated in FIG. 8, the maximum capacity of the conventional sulfuric acid adding facility 100 is, for example, as follows as a designed value.

[Maximum capacity of pump in conventional sulfuric acid adding facility]=[discharge port $Pa_1$+ discharge port $Pa_2$ of first sulfuric acid supply pump $PA$]+[discharge port $Pa_3$ of first sulfuric acid supply pump $PA$]

=26 m³/hr+13 m³/hr

=39 m³/hr

As described above, according to the method for operating the sulfuric acid adding facility 10 according to the present embodiment, it is possible to increase the maximum capacity of the pump and further to operate the pump with a margin in its capacity in association with an increase in the maximum ability as compared to the conventional sulfuric acid adding facility 100. This makes it possible to decrease the occurrence of problems and to effectively increase the working rate.

<3-2. Operation Method at Time When the Sulfuric Acid Supply Pump Stops Operation>

Furthermore, according to the sulfuric acid adding facility 10 (see FIG. 2) according to the present embodiment, it is possible to continue the addition of sulfuric acid into the autoclave 1 even in a case in which the operation of a predetermined sulfuric acid supply pump 12 is required to be stopped due to maintenance and inspection, the occurrence of problems, and the like.

Specifically, at the time when the operation of any one of the nth (n=1 or 2 in the sulfuric acid adding facility 10) sulfuric acid supply pumps 12 installed in the sulfuric acid adding facility 10 is stopped due to maintenance and inspection and the like, the nth sulfuric acid supply pump 12 is put in a stopped state by stopping the more than half of the three or more diaphragms 21 of the nth sulfuric acid supply pump 12 in a state in which the sulfuric acid supply pump 12 other than the nth sulfuric acid supply pump 12 of which working is to be stopped is operated.

In other words, when a case in which the second sulfuric acid supply pump 12B in the sulfuric acid adding facility 10 is stopped for maintenance and inspection is described as an example, first the second sulfuric acid supply pump 12B is put in a stopped state by stopping the two diaphragms $21b_1$ and $21b_2$, which are more than half of the three diaphragms $21b$ of the second sulfuric acid supply pump 12B in a state in which a sulfuric acid supply pump other than the second sulfuric acid supply pump 12B of which working is to be stopped, namely the first sulfuric acid supply pump 12A is operated. Incidentally, the second sulfuric acid supply pump 12B is completely in a stopped state by stopping the diaphragms $21b_1$ and $21b_2$ since the remaining diaphragm $21b_3$ of the second sulfuric acid supply pump 12B is in a non-operating state at the time of normal operation.

Thereafter, in the sulfuric acid supply pump other than the second sulfuric acid supply pump 12B in the stopped state, namely the first sulfuric acid supply pump 12A, one diaphragm 21$a_3$, which is fewer than half of the three or more diaphragms 21$a$, is operated and sulfuric acid is added into the autoclave 1 via the second sulfuric acid addition pipe 11B connected to the discharge port 22$a_3$ of the diaphragm 21$a_3$. In other words, the addition of sulfuric acid through the second sulfuric acid addition pipe 11B, which has been performed by operation of the second sulfuric acid supply pump 12B, is performed by operating the diaphragm 21$a_3$, which is fewer than half of the three or more diaphragms 21$a$ and is stopped at the time of normal operation, and adding sulfuric acid via the second sulfuric acid addition pipe 11B connected to the discharge port 22$a_3$.

Figure 7:
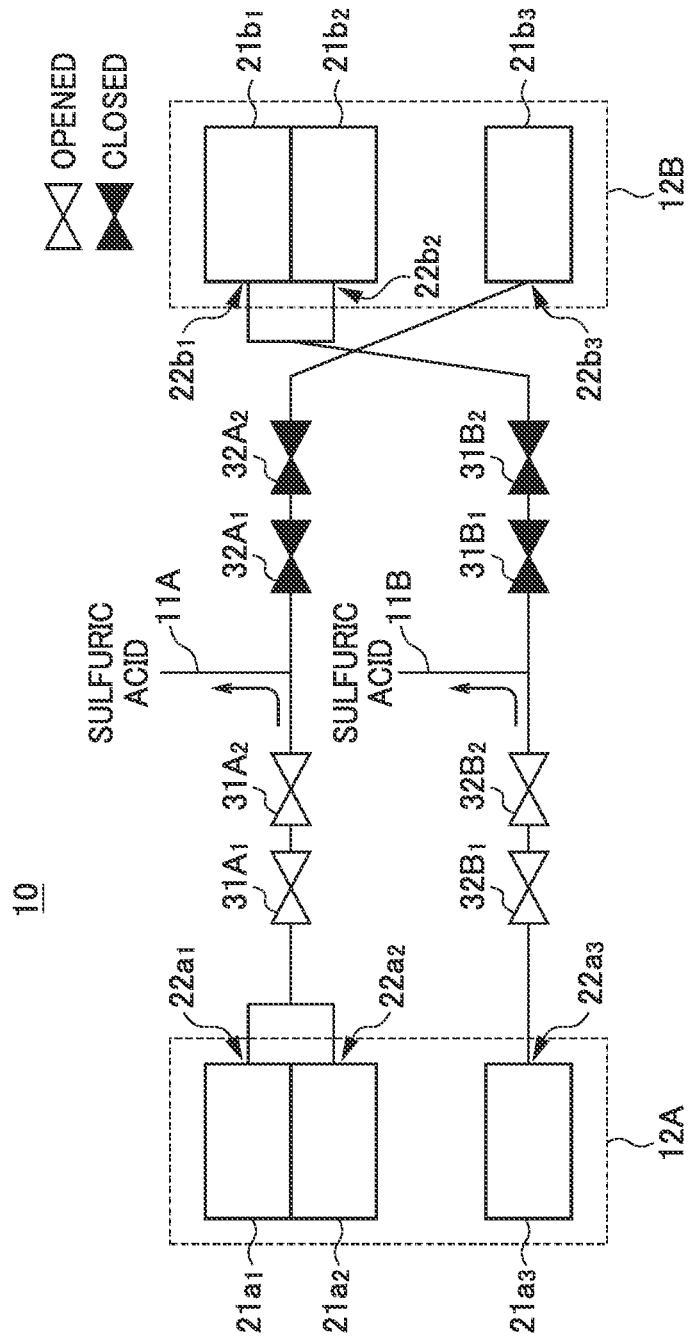

Incidentally, FIG. 7 is a configuration diagram illustrating a state (opened and closed state of valves 31 and 32) when the second sulfuric acid supply pump 12B is stopped for maintenance and inspection and the like.

By operating the pump in this manner, it is possible to add sulfuric acid into the autoclave 1 through both of the first sulfuric acid addition pipe 11A and the second sulfuric acid addition pipe 11B using only the first sulfuric acid supply pump 12A even in a case in which the second sulfuric acid supply pump 12B is required to be stopped for maintenance and inspection and the like. Moreover, it is possible to continuously supply sulfuric acid from the discharge ports 22$a_1$ and 22$a_2$ of the first sulfuric acid supply pump 12A from the time of normal operation even when the operation of the second sulfuric acid supply pump 12B to be in a stopped state is stopped, and it is thus possible to extremely effectively increase the working rate. Incidentally, in such an operation state, although the amount of sulfuric acid added to the autoclave 1 decreases by about 25% only during the time to cope with maintenance and inspection and any problems occurring, the shortage of the amount of sulfuric acid added can be minimized and effective operation is possible.

Here, the procedure of the specific manipulation at the time when the operation of the second sulfuric acid supply pump 12B is stopped due to the maintenance and inspection and the like is described.

[1] First, the emergency stop button of the second sulfuric acid supply pump 12B of which working is to be stopped is pressed to stop the second sulfuric acid supply pump 12B. By this manipulation, the valve 33B provided in the second sulfuric acid addition pipe 11B illustrated in FIG. 5 is closed. Meanwhile, as illustrated in FIG. 5, a valve 71 and a valve 72 provided in a nitrogen supply pipe 70 for supplying nitrogen ($N_2$) gas for mainly purging the residual sulfuric acid in the pipe are opened and the purging of the second sulfuric acid addition pipe 11B with $N_2$ gas is started.

Incidentally, as the manipulation for removal of sulfuric acid remaining in the sulfuric acid addition pipe 11, the valves 71 and 72 of the nitrogen supply pipe 70 are opened and $N_2$ gas supplied from the nitrogen cylinder is allowed to pass through the sulfuric acid addition pipe 11B and is also blown into the autoclave 1, for example, in the case of purging the sulfuric acid addition pipe 11B with $N_2$ gas. When the purging with $N_2$ gas for a predetermined set time is completed, valves 34B and 35B of the sulfuric acid addition pipe 11B and the valves 71 and 72 of the nitrogen supply pipe 70 are closed and the addition of sulfuric acid is completely stopped. Incidentally, the manipulation of purging of the sulfuric acid addition pipe 11A with $N_2$ gas is also performed by the opening and closing control of valves 73 and 74 of the nitrogen supply pipe 70 and the opening and closing control of the valves 34A and 35A of the sulfuric acid addition pipe 11A in the same manner.

[2] Next, when the addition of sulfuric acid through the second sulfuric acid addition pipe 11B is completely stopped, in the configuration diagram illustrated in FIG. 2, valves 31$B_1$ and 31$B_2$ for supplying sulfuric acid from the second sulfuric acid supply pump 12B to the second sulfuric acid addition pipe 11B are closed and valves 32$B_1$ and 32$B_2$ for supplying sulfuric acid from the first sulfuric acid supply pump 12A to the second sulfuric acid addition pipe 11B are then opened.

[3] Next, the pressure in the second sulfuric acid addition pipe 11B is adjusted.

[4] Next, on a manipulation panel 3 (see FIG. 4) on the DSC, the selection switch 54 for "pump B-line B" is deselected and the selection switch 52 for "pump A-line B" is pushed to be selected.

[5] Next, the pump output and stroke of the first sulfuric acid supply pump 12A are lowered to the minimum load. Incidentally, the flow rate of sulfuric acid in the second sulfuric acid addition pipe 11B is appropriately detected by a flowmeter 41B.

[6] Next, on the manipulation panel 3 (see FIG. 4) on the DSC, the start button 55 of the sulfuric acid addition start sequence is pressed. By this, the valves 33B and 34B provided to the second sulfuric acid addition pipe 11B in the configuration diagram illustrated in FIG. 5 are opened.

[7] Thereafter, the pump output and stroke of the first sulfuric acid supply pump 12A are adjusted, and when the differential pressure between a pressure gauge 40B of the second sulfuric acid addition pipe 11B and a pressure gauge 1P of the autoclave 1 illustrated in FIG. 5 reaches the set value, the addition of sulfuric acid to be discharged from the discharge port 22$a_3$ of the first sulfuric acid supply pump 12A to the autoclave 1 via the second sulfuric acid addition pipe 11B is started as the valve 35B is opened.

EXAMPLES

Hereinafter, the present invention will be described more specifically with reference to Examples, but the present invention is not at all limited to the following Examples.

Example 1, Comparative Example 1

As Example 1, a sulfuric acid addition operation using the sulfuric acid adding facility 10 of which the configuration diagram was illustrated in FIG. 2 was performed. Meanwhile, as Comparative Example 1, a sulfuric acid addition operation using the conventional sulfuric acid adding facility of which the configuration diagram was illustrated in FIG. 8 was performed.

The data obtained by comparing the maximum amounts of sulfuric acid added in the respective operations of Example 1 and Comparative Example 1 to each other are presented in the following Table 1. As is clear from Table 1, it can be seen that according to the operation of Example 1 using the sulfuric acid adding facility 10, the maximum capacities of the first sulfuric acid supply pump 12A and the second sulfuric acid supply pump 12B increase as compared to those in the conventional operation (Comparative Example 1).

TABLE 1

| | Example 1 | Comparative Example 1 |
|---|---|---|
| Maximum flow rate[$m^3$/hr] | 50 | 38 |

Next, the working rate of the sulfuric acid supply pump 12 (the first sulfuric acid supply pump 12A and the second sulfuric acid supply pump 12B) in the sulfuric acid addition operation using the sulfuric acid adding facility 10 of Example 1 was compared to the working rate of the sulfuric acid supply pump in the sulfuric acid addition operation using the conventional sulfuric acid adding facility of Comparative Example 1. Incidentally, the working rate is calculated by using only the stop time due to problems in the sulfuric acid supply pump itself and is not affected by the stop time of sulfuric acid addition due to the influence of other facilities and steps.

The data obtained by comparing the working rates to each other is presented in the following Table 2. As is clear from Table 2, it can be seen that the working rate of the sulfuric acid supply pump in the sulfuric acid adding facility 10 has increased as compared to that in the conventional sulfuric acid adding facility.

TABLE 2

|  | Example 1 | Comparative Example 1 |
|---|---|---|
| Number of stopping of sulfuric acid addition[Times] | 0 | 15 |
| Stop time of sulfuric acid addition[hr] | 0 | 9.4 |
| Working rate[%] | 100 | 98.7 |

EXPLANATION OF REFERENCE NUMERALS

1 Autoclave
1a to 1g Compartment
2 Ore slurry charging pipe
3 Stirrer
4 Leached slurry discharge pipe
10, 10', and 100 Sulfuric acid adding facility
11, 11A, 11B, and 11C Sulfuric acid addition pipe
12, 12A, 12B, and 12C Sulfuric acid supply pump
21, 21a, 21b, and 21c Diaphragm
22, 22a, 22b, and 22c Discharge port
31 to 35 and 71 to 74 Valves (flow valves)
50 and 60 Manipulation panel

The invention claimed is:

1. A sulfuric acid adding facility for adding sulfuric acid to an autoclave used in a leaching step in a high pressure nickel oxide ore acid leaching method, the facility comprising:
a plurality of sulfuric acid addition pipes for adding sulfuric acid into the autoclave and
a plurality of sulfuric acid supply pumps that are connected to the sulfuric acid addition pipes and supply sulfuric acid to the sulfuric acid addition pipes, wherein
the number of sulfuric acid addition pipes and sulfuric acid supply pumps is the same and is two or more;
each sulfuric acid supply pump includes three or more diaphragms and the same number of discharge ports as the number of the diaphragms, wherein:
more than half of the discharge ports of a kth sulfuric acid supply pump are
connected to a corresponding (kth) sulfuric acid addition pipe, wherein "kth" represents one of the two or more sulfuric acid supply pumps, and
the remaining discharge ports of the kth sulfuric acid supply pump are connected to sulfuric acid addition pipes other than the kth sulfuric acid addition pipe, and
the sulfuric acid addition pipes to which the remaining discharge ports are connected to the discharge ports of diaphragms of sulfuric acid supply pumps other than the kth sulfuric acid supply pump so as not to overlap with the sulfuric acid addition pipes to which the remaining discharge ports are connected.

2. A method for operating a sulfuric acid adding facility for adding sulfuric acid to an autoclave used in a leaching step in a high pressure nickel oxide ore acid leaching method, wherein
the sulfuric acid adding facility includes:
a plurality of sulfuric acid addition pipes for adding sulfuric acid into the autoclave and
a plurality of sulfuric acid supply pumps that are connected to the sulfuric acid addition pipes and supply sulfuric acid to the sulfuric acid addition pipes, wherein
the number of sulfuric acid addition pipes and sulfuric acid supply pumps is the same and is two or more;
each sulfuric acid supply pump includes three or more diaphragms and the same number of discharge ports as the number of the diaphragms, wherein:
more than half of the discharge ports of a kth sulfuric acid supply pump are
connected to a corresponding (kth) sulfuric acid addition pipe, wherein "kth" represents one of the two or more sulfuric acid supply pumps, and
the remaining discharge ports of the kth sulfuric acid supply pump are connected to sulfuric acid addition pipes other than the kth sulfuric acid addition pipe, and
the sulfuric acid addition pipes to which the remaining discharge ports are connected to the discharge ports of diaphragms of sulfuric acid supply pumps other than the kth sulfuric acid supply pump so as not to overlap with the sulfuric acid addition pipes to which the remaining discharge ports are connected;
wherein the method of operation comprises, at the time of normal operation of the sulfuric acid adding facility,
an operating step wherein more than half of the three or more diaphragms are operated and the remaining-diaphragms are stopped at each of the sulfuric acid supply pumps, and
an adding step wherein sulfuric acid is added into the autoclave by discharging sulfuric acid from a discharge port of an operated diaphragm via the corresponding sulfuric acid addition pipe.

3. The method for operating a sulfuric acid adding facility according to claim 2, wherein
the sulfuric acid adding facility includes two sulfuric acid addition pipes and two sulfuric acid supply pumps,
and, at the time when operation of any one of the sulfuric acid supply pumps is to be stopped,
the method comprises a stopping step wherein a kth sulfuric acid supply pump is put in a stopped state by stopping the operated diaphragms of the kth sulfuric acid supply pump, and
an opening step wherein, in the sulfuric acid supply pumps other than the kth sulfuric acid supply pump, the remaining stopped diaphragms are operated and sulfuric acid is added into the autoclave via a sulfuric acid addition pipe to which the remaining discharge ports of are connected.

* * * * *